US007460999B2

(12) United States Patent
Herron et al.

(10) Patent No.: US 7,460,999 B2
(45) Date of Patent: Dec. 2, 2008

(54) METHOD AND APPARATUS FOR EXECUTING TASKS IN VOICE-ACTIVATED COMMAND SYSTEMS

(75) Inventors: Daniel Thomas Herron, Sammamish, WA (US); David G. Ollason, Seattle, WA (US); Siddharth Bhatia, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 822 days.

(21) Appl. No.: 10/939,605

(22) Filed: Sep. 13, 2004

(65) Prior Publication Data

US 2006/0056601 A1    Mar. 16, 2006

(51) Int. Cl.
G10L 21/06    (2006.01)
(52) U.S. Cl. .................. 704/275; 379/88.03; 704/270
(58) Field of Classification Search .......... 704/270, 704/270.1, 275; 379/88.03
See application file for complete search history.

(56) References Cited

U.S. PATENT DOCUMENTS

| 6,018,568 | A  | * | 1/2000  | Furman et al. ........... 379/93.15 |
| 6,556,662 | B1 | * | 4/2003  | Miller et al. ............. 379/67.1 |
| 6,963,633 | B1 | * | 11/2005 | Diede et al. ............. 379/88.03 |
| 2004/0230435 | A1 | * | 11/2004 | Douros ..................... 704/275 |

OTHER PUBLICATIONS

"Fujitsu Call Center System CCRM-1 Product Description" Fujitsu Call Center System CCRM-1—Product Description, Fujitsu, Sep. 2002.
"Voice Dialer 364 Data Book", Interactive Speech, Sensory Voice Activation, Sensory, Inc. P/N 80-0174-4, 2000.
MacLoed, R., "Linking the New Network to the PSTN Call Management Features on the Brooktrout TR 1000", Brooktrout Technolgoy, Jun. 2000.
Gina-Anne Levow, "Making Sense of Silence in Speech User Interfaces", CHI '97 Workshop: Speech User Interface Design Challenges (1997).
Nitin Sawhney, "Nomadic Radio: Speech and Audio Interaction for Contextual Messaging in Nomadic Environments", ACM Transactions on Computer-Human Interaction, vol. 7, No. 3, Sep. 2000, pp. 353-383.
Keith Byerly, "Echo Cancellation for AST Applications", Brooktrout Technology, Apr. 2002.
"Avaya™ Predictive Dialing System Multi-Dialer", Avaya Predictive Dialing System, White Paper, Jan. 2002.
"Deplying Voice-enabled Applications", Oracle, An Oracle White Paper, Oct. 2002.

* cited by examiner

*Primary Examiner*—Susan McFadden
(74) *Attorney, Agent, or Firm*—John Veldhuis-Kroeze; Westman, Champlin & Kelly, P.A.

(57) ABSTRACT

A method of executing operations in a voice-activated command system includes automatically initiating execution of a default operation. A user is then prompted, after the default operation has been initiated, to determine whether the user wishes to execute a second operation instead of the default operation. If the user wishes to execute the second operation instead of the default operation, execution of the default operation is terminated and execution of the second operation is initiated. In voice-activated and other command systems, such as voice dialing systems, this method allows the command system to execute the most probable operation without delay, while still making the system easily navigable by naïve users. Systems, computer readable medium and apparatus which implement the methods of the present invention are also disclosed.

8 Claims, 7 Drawing Sheets

METHOD AND APPARATUS FOR EXECUTING TASKS IN VOICE-ACTIVATED COMMAND SYSTEMS

BACKGROUND OF THE INVENTION

The present invention generally pertains to voice-activated command systems and speech recognition applications. More specifically, the present invention pertains to methods and apparatus for executing a task in a voice-activated command system in conjunction with prompting a user for instructions.

Voice-activated command systems typically present to a user a list of possible actions to be taken, and wait for the user to select an item from the list. Time to completion of the selected action or task is frequently an important factor in evaluating system performance. Advanced users of a voice-activated command system are typically capable of learning to navigate through the prompt process more quickly, thereby potentially shortening the time to completion of the eventually selected action or task. However, to make the system usable by naïve users, the prompt process is such that it frequently slows down the overall system.

One such type of voice-activated command system is automatic voice-dialing systems. Automatic voice-dialing systems are high-volume systems that need to cater to both advanced and naïve users. Time-to-completion (how long it takes for a caller to be connected to the person he or she is trying to reach) is one of the most important metrics, but as mentioned, attempts to make the system usable by naïve users will often slow down the overall system. Advanced users can be expected to learn to use 'mixed-initiative' (i.e., to provide more information than the system has requested, in order to minimize the number of dialog turns), but naïve users are expected to provide only the information requested at each turn.

Because it is difficult to personalize a voice-dialing system based on the caller's history, making a system that is both 'fast' (short time-to-completion) and 'full' (usable by naïve users) is challenging. A particular case in a voice-dialing system is the ability to reach a contact at one of multiple phone numbers. Advanced users might learn that they can specify which number they would like to call during, for example, the confirmation prompt (System: "Am I right with John Smith?"→User: "Yes, call the cell phone"). Unless naïve users are given an explicit opportunity to choose which number to call, however, they will never realize this feature exists. Thus an extra dialog turn is required, which slows the overall system, even if callers almost always choose one type of number (e.g., the office number is chosen 95% of the time). While these specific examples are provided with reference to a voice-dialing system, these difficulties are experienced by a wide variety of voice-activated command systems.

The present invention provides solutions to one or more of the above-described problems and/or provides other advantages over the prior art.

SUMMARY OF THE INVENTION

A method of executing operations in a voice-activated or other types of command systems includes automatically initiating execution of a default operation. A user is then prompted, after the default operation has been initiated, to determine whether the user wishes to execute a second operation instead of the default operation. If the user wishes to execute the second operation instead of the default operation, execution of the default operation is terminated and execution of the second operation is initiated. In voice-activated and other command systems, such as voice dialing systems, this method allows the command system to execute the most probable operation without delay, while still making the system easily navigable by naïve users. Systems, computer readable medium and apparatus which implement the methods of the present invention are also disclosed.

Other features and benefits that characterize embodiments of the present invention will be apparent upon reading the following detailed description and review of the associated drawings.

DETAILED DESCRIPTION OF ILLUSTRATIVE EMBODIMENTS

I. Exemplary Environments

Various aspects of the present invention pertain to methods, systems and apparatus for executing tasks or operations in a voice-activated or other type of command system. Examples of well-known computing systems, environments, and/or configurations that may be suitable for use with the invention include, but are not limited to, personal computers, server computers, hand-held or laptop devices, multiprocessor systems, microprocessor-based systems, set top boxes, and voice-activated command systems such as automatic voice-dialing applications. Embodiments of the present invention can be implemented in association with a call routing system, wherein a caller identifies with whom they would like to communicate and the call is routed accordingly. It should also be noted that the present invention is not limited to call routing systems. These are simply examples of systems within which embodiments of the present invention can be implemented. In other embodiments, the present invention is implemented in a voice-activated command system in which a user is asked to select an operation or task to be executed.

Prior to discussing embodiments of the present invention in detail, exemplary computing environments within which the embodiments and their associated systems can be implemented will be discussed.

Figure 1:
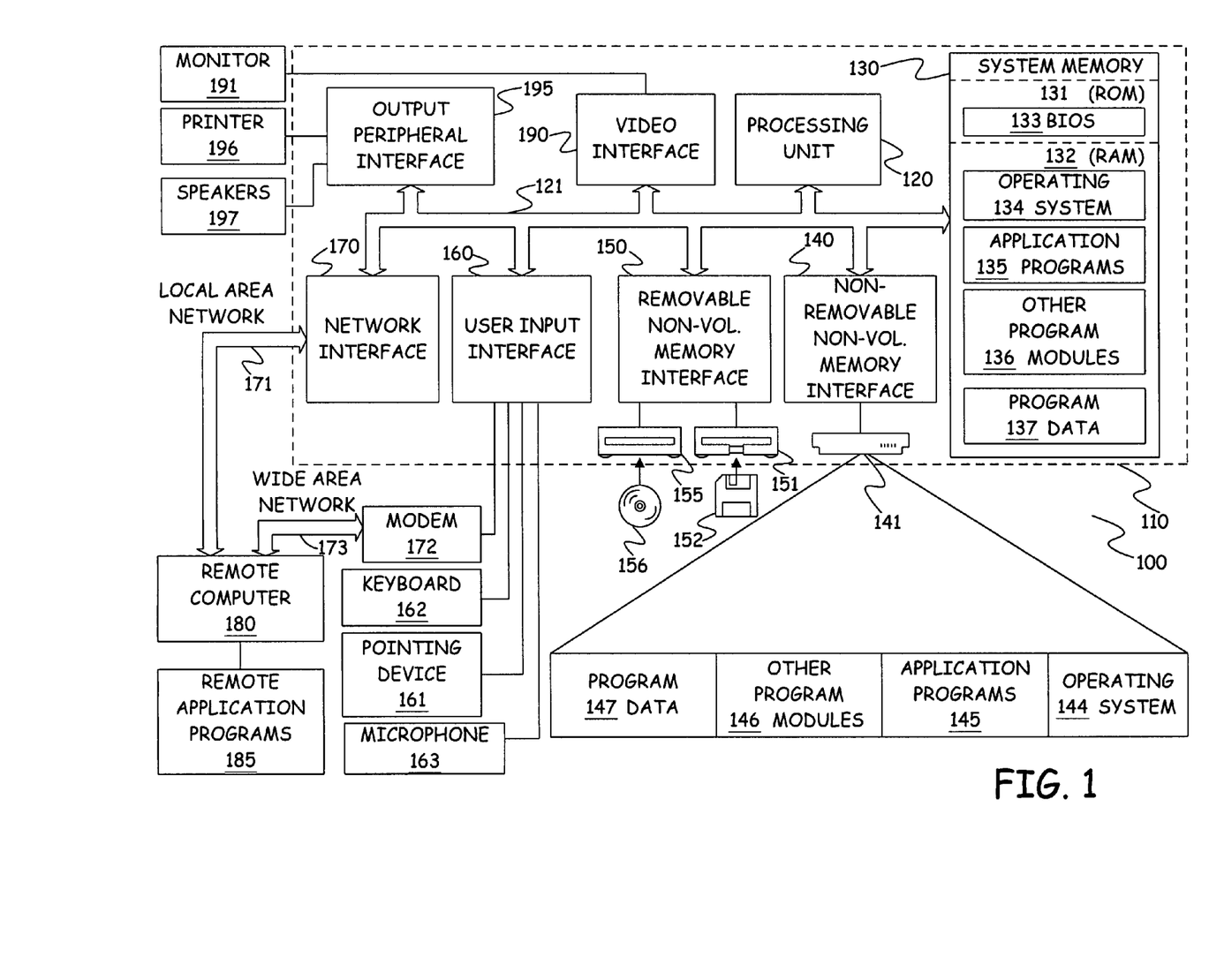
FIG. 1 is a block diagram representation of a general computing environment in which illustrative embodiments of the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

II. Voice-Command System

The present invention can be implemented, for example, in voice-command systems (or voice-activated command systems) in which a user interacts with the system to execute one of a number of possible operations. As noted above, creating a voice-command system that is both "fast" (short time-to-completion) and "full" (usable by naïve users) is challenging. The extra dialog turns (prompts from the system and navigation commands from the user) required to make a system which is easy for naïve users to interact with, frequently slow the system down.

In accordance with embodiments of the present invention, this problem is addressed by assuming a default operation (such as calling a default telephone number) is to be executed unless the user has explicitly commanded that a different operation be executed (such as calling a secondary number). The system immediately begins execution of the default operation, but then prompts the user, during execution of the default operation, to determine whether the user wishes to execute a different operation instead. The result is a system which is capable of completing the default operation in as little time as is practical for a system of this type, while maintaining prompt features needed to allow naïve users to use the system.

The present invention is described below with reference to both general voice-activated command systems, and more specifically to automatic voice-dialing systems. While the present invention can be embodied in a wide variety of voice-activated command systems, it is not limited to use with voice-activated command systems. Instead, the present invention applies more generally to command systems where a user is verbally prompted to select from a list of possible options. The selection by the user of an item or option from the list need not be accomplished using voice activation, but rather can be accomplished using any desired type of input from the user, including for example inputs from input devices such as pointer devices (such as a mouse), computer keyboards, telephone keypads, etc.

A. General Voice-Activated Command System Overview

Figure 2:
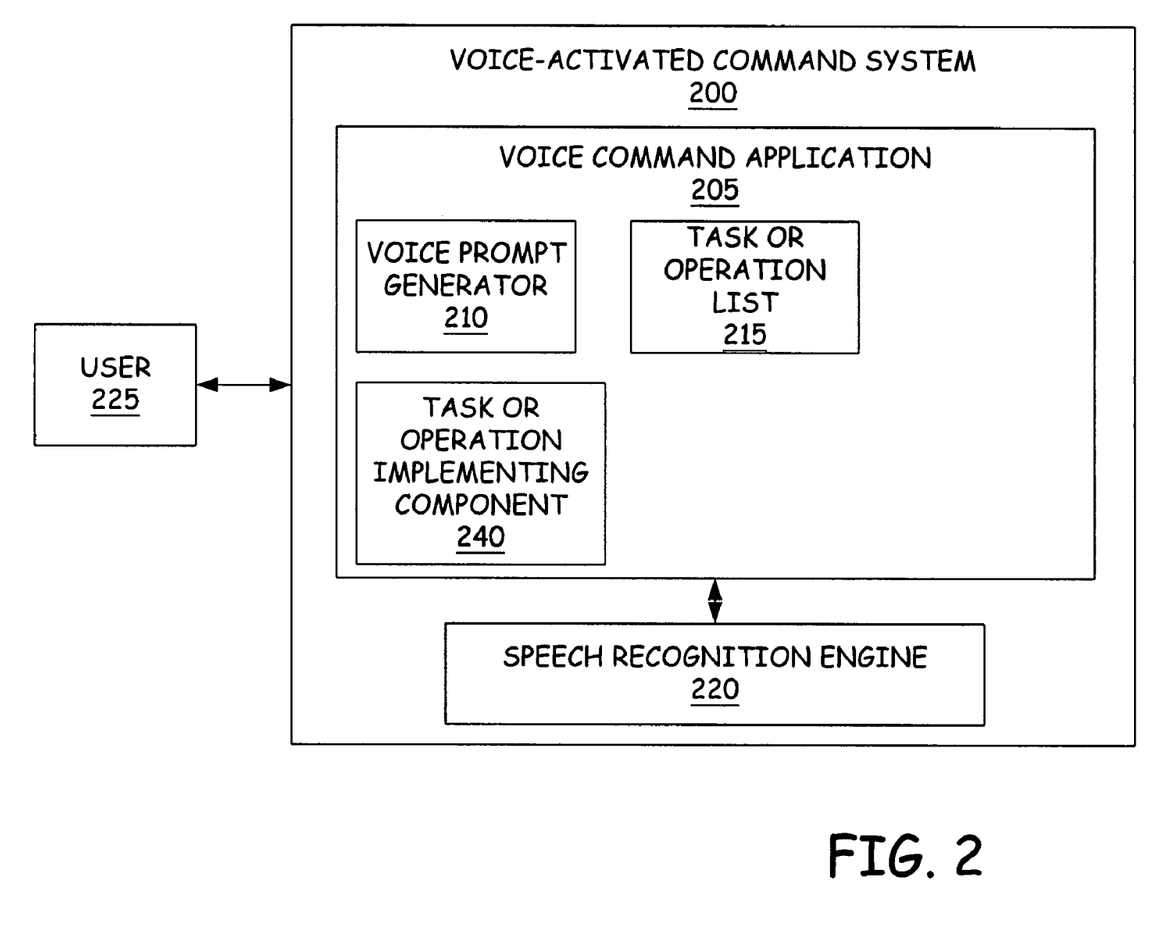
FIG. 2 is a schematic block diagram representation of a voice-activated command system.

FIG. 2 is a schematic block diagram of a voice-activated command system 200 in accordance with an example embodiment of the present invention. System 200 is accessible by a user 225 to implement a task or an operation. System 200 includes a voice command application 205 having access to a list or database 215 of choices to be presented to the user for selection and/or execution. For example, the list of choices can include a list of names of potential call recipients in a voice-dialer application; a list of telephone numbers for a particular call recipient in a voice-dialer application; a list of potential tasks or operations in an automated system such as an automated banking system; etc. Many other types of lists of choices can be presented as well.

As in conventional voice-activated command systems, in system 200 the voice command application 205 includes a voice prompt generator 210 configured to generate voice prompts which ask the user to select one of the choices in the list 215. The voice prompts can be generated, for example, using voice talent recordings or text-to-speech (TTS) generation. System 200 also includes speech recognition engine 220 which is configured to recognize verbal or audible inputs (voice commands) from the user 225 during or in response to the generation of voice prompts by voice prompt generator 210.

In exemplary embodiments, voice command application 205 also includes task implementing module or component 240 configured to carry out the tasks or operations using methods of the present invention. For example, component 240 can embody the function of connecting a caller to a particular telephone number of an intended call recipient in a voice dialer application implementation of system 200. In other implementations of system 200, component 240 carries out tasks or operations which correspond to the particular type of system.

Figure 3:
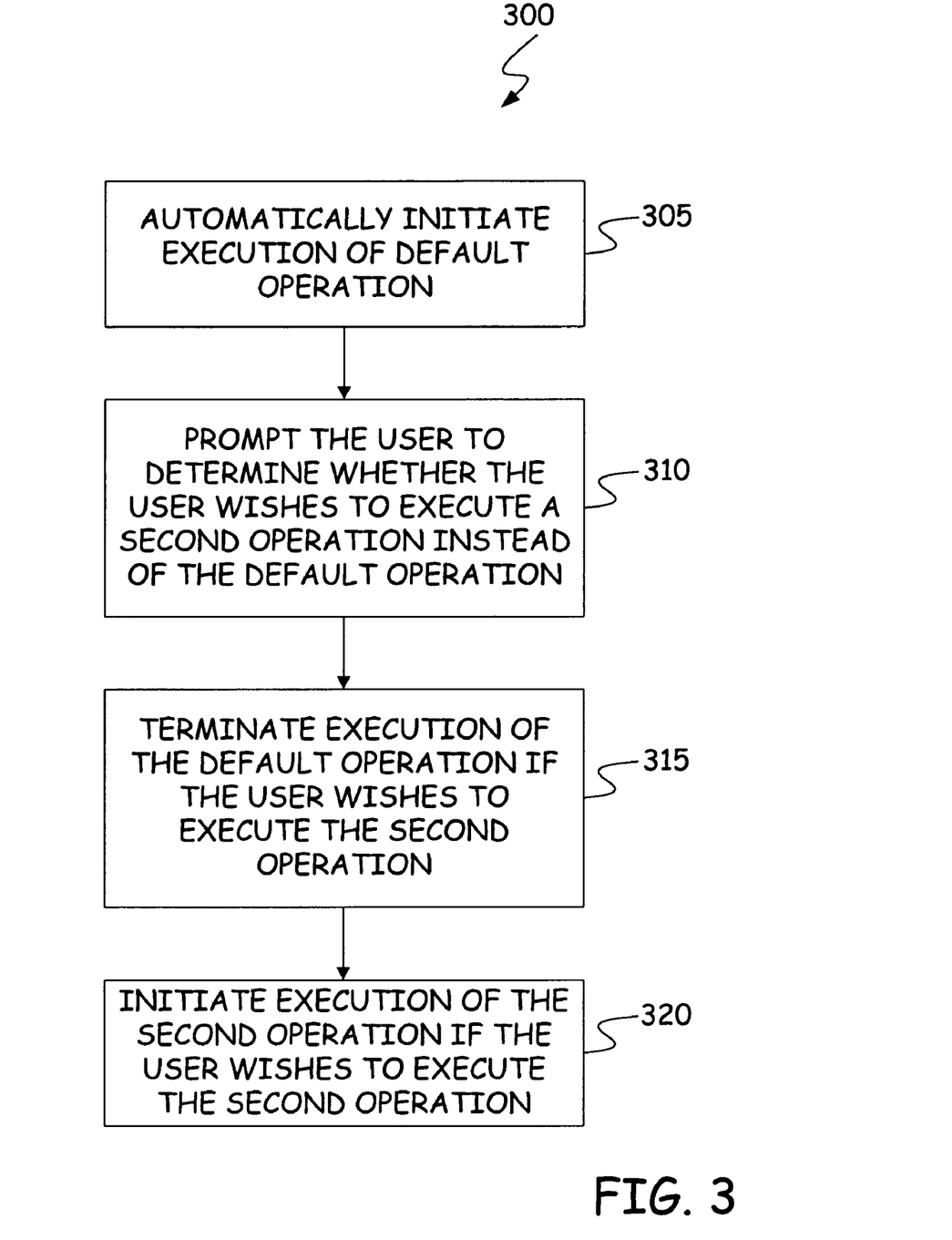
FIGS. 3 and 4 are block diagrams illustrating a method in accordance with embodiments of the present invention.

Referring now to FIG. 3, shown is a flow diagram 300 illustrating methods of executing operations in a voice-activated or other type of command system. The method can be implemented, for example, using the components of command system 200 shown in FIG. 2. The method allows the command system to execute a probable preferred operation or task, referred to as a default operation, as quickly as possible, while still allowing a user to select other tasks or operations to execute instead of the default operation.

As shown at block 305 of FIG. 3, the method includes the step of automatically initiating execution of a default operation. Then, after the default operation has been initiated, the user is prompted to determine whether a second operation should be executed instead of the default operation. This step is illustrated at block 310. As illustrated at blocks 315 and 320, if the user indicates a desire to execute the second operation instead of the default operation, then execution of the default operation is terminated, and execution of the second operation is initiated.

Figure 4:
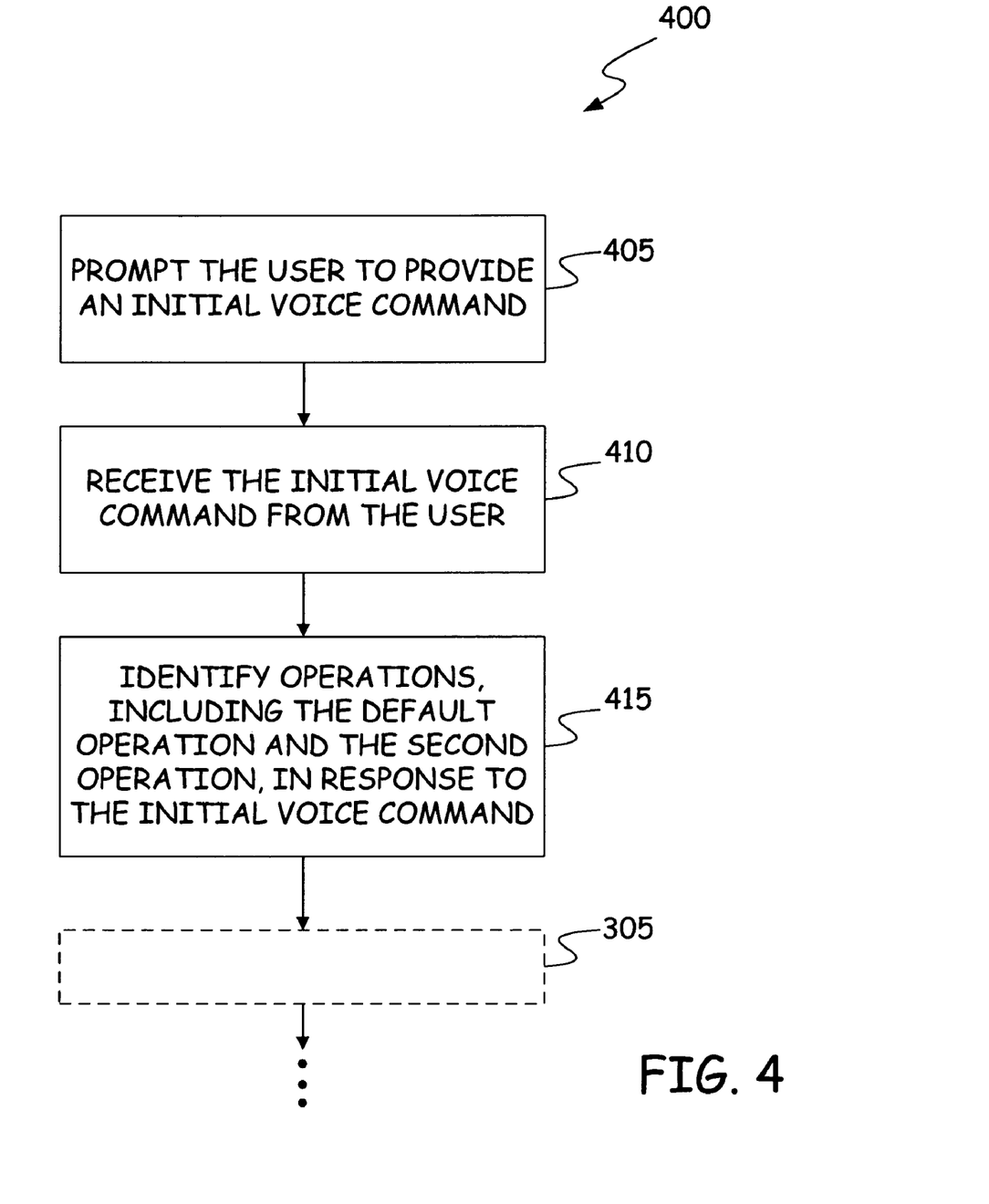

Referring now to FIG. 4, shown is a flow diagram 400 representing some additional steps which can be implemented in the methods of the present invention. These steps are implemented before the step, shown at block 305 in FIG. 3, of automatically initiating execution of the default operation. As shown at blocks 405 and 410 in FIG. 4, the method can include the steps of prompting the user to provide an initial voice command, and of receiving the initial voice command in response. Then, in response to the initial voice command, the method includes the step shown at block 415 of identifying tasks or operations, including the default operation and the second operation. These additional steps illustrate the case where an initial voice command is necessary to identify multiple potential operations which can be taken, with one of the multiple potential operations being designated as the default operation. A more specific example of this is provided below with reference to a voice-dialing system in which an initial voice command from the caller is required to specify an intended call recipient, and then multiple phone numbers of the intended call recipient are identified, with one of them being designated as the default telephone number.

Other modifications to the method steps illustrated in FIGS. 3 and 4 are also understood to be included in the concepts of the present invention. For example, before terminating execution of the default operation (as shown at block 315) and initiating execution of the second operation (as shown at block 320), the method can require that a second voice command be received from the user to instruct the system to execute the second operation instead of the default operation. This is illustrated further below with reference to a voice-dialing system. Similarly, the step shown at block 305 of automatically initiating execution of the default operation includes, in some embodiments, generating an audible indication to the user that the default operation is being executed. Then, the step shown at block 310 of prompting the user to determine whether the user wishes to execute the second operation instead of the default operation can include generating this prompt during the generation of the audible indication that the default operation is being executed. The example of this feature described below is of the prompt being generated while an audible representation of the default phone ringing is also being generated.

B. Voice-Dialing System

Figure 5:
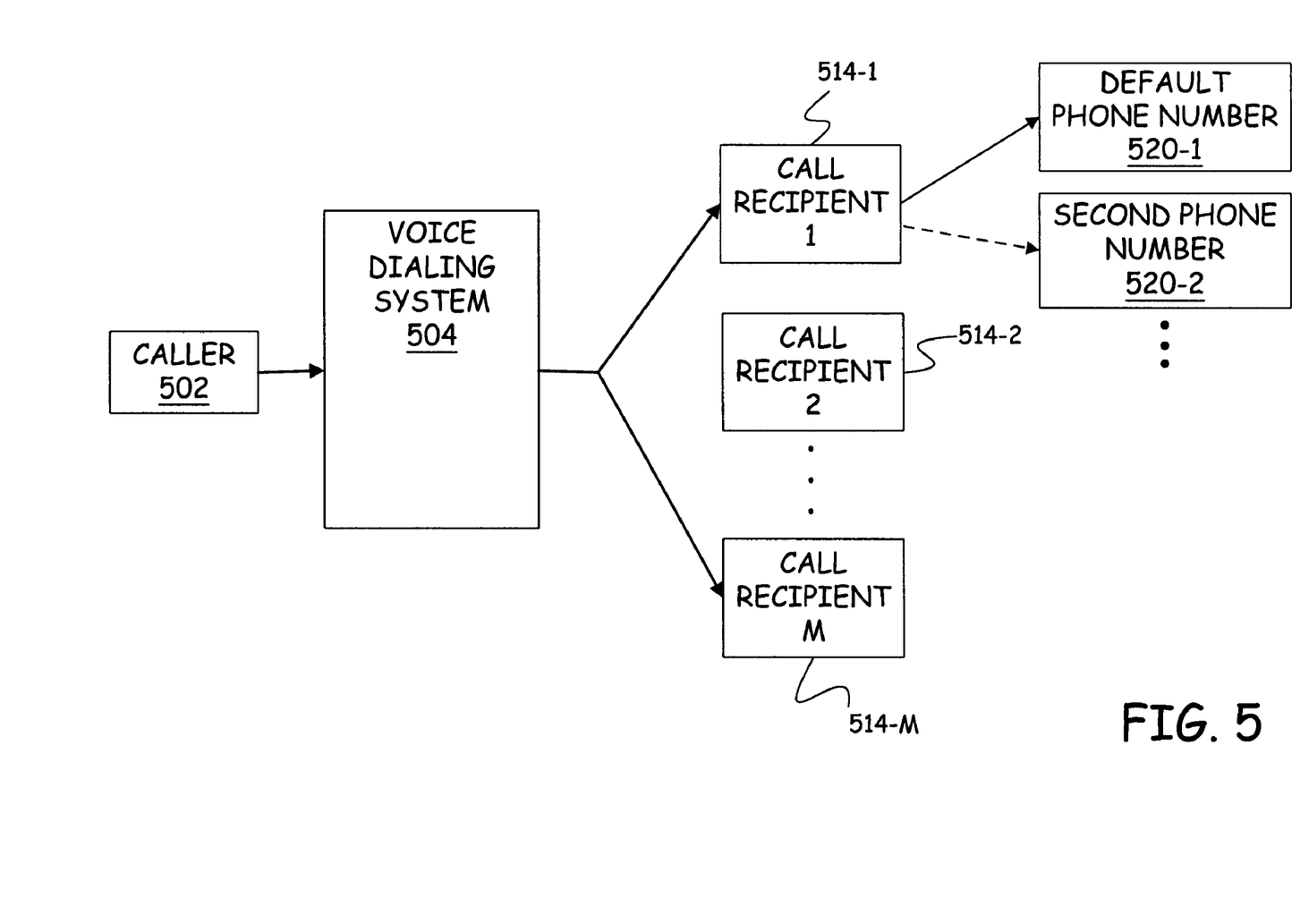
FIG. 5 is a schematic block diagram representing a voice-dialing system embodiment of the voice-activated command system shown in FIG. 2.

Referring now to FIG. 5, shown is a schematic block diagram of a voice-dialing system 504 which is an example of a more particular embodiment of system 200 shown in FIG. 2. System 504 is illustratively implemented within one of the computing environments discussed in association with FIG. 1, or within other computing environments. As shown in FIG. 5, voice-dialing system 504 is accessible by caller 502 who wishes to be connected to, or leave a message for, one of potential call recipients 514 (potential call recipients 514-1 through 514-M are illustrated). For individual potential call recipients 514, each will typically have one or more phone numbers 520 to which system 504 can connect the caller 502.

In this example, assume that potential call recipient 514-1 is the intended call recipient, and that two phone numbers are available for call recipient 514-1. For example, a first phone number 520-1 can be an office phone number, while a second phone number 520-2 can be a cell or mobile phone number. Additional phone numbers can also be associated with call recipient 514-1. In this example, assume that phone number 520-1 is considered the default phone number for call recipient 514-1.

Accuracy and speed are typically the two most important determinants of a successful voice-dialer. Many users of the system have a choice between using the voice-dialer or manually looking up a phone number and dialing it, and will only choose the former if it is faster. Thus, reducing the number of dialog turns is critical to success. Nonetheless, users also crave a feature-rich system, and the ability to call (or be called at) multiple numbers is a commonly-requested feature. The present invention provides this feature without adding the penalty of an extra dialog turn.

After the identity of the user to be called (call recipient 514-1) has been confirmed, a default phone number 520-1 is chosen (usually the office number, unless this is not available). A call to this number is then initiated, and the caller 502 hears the normal ringing. If the call goes unanswered for a short period (e.g., two rings), a prompt is played, mixed simultaneously with the continuing rings, instructing the caller to say, for example "call the cell", in order to try the called-party's cell phone number (for example second phone number 520-2). At the same time, the speech recognizer (shown in system 200) is activated. If the user speaks a request that matches the required grammar, the current call transfer is aborted, and a new transfer (in this case, to the cell phone number) is begun.

Figure 6:
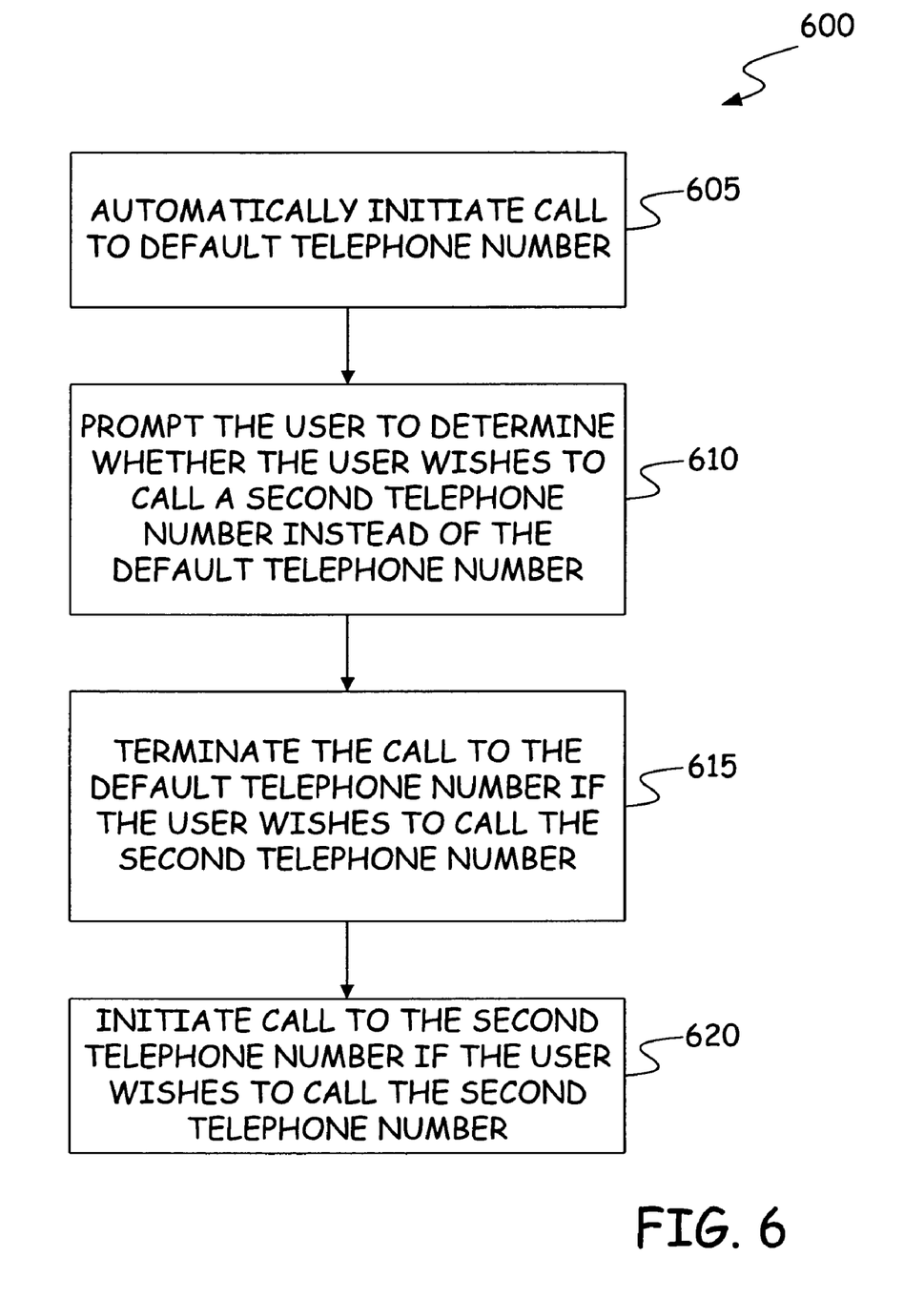
FIGS. 6 and 7 are block diagrams illustrating a method in accordance with embodiments of the present invention.
Figure 7:
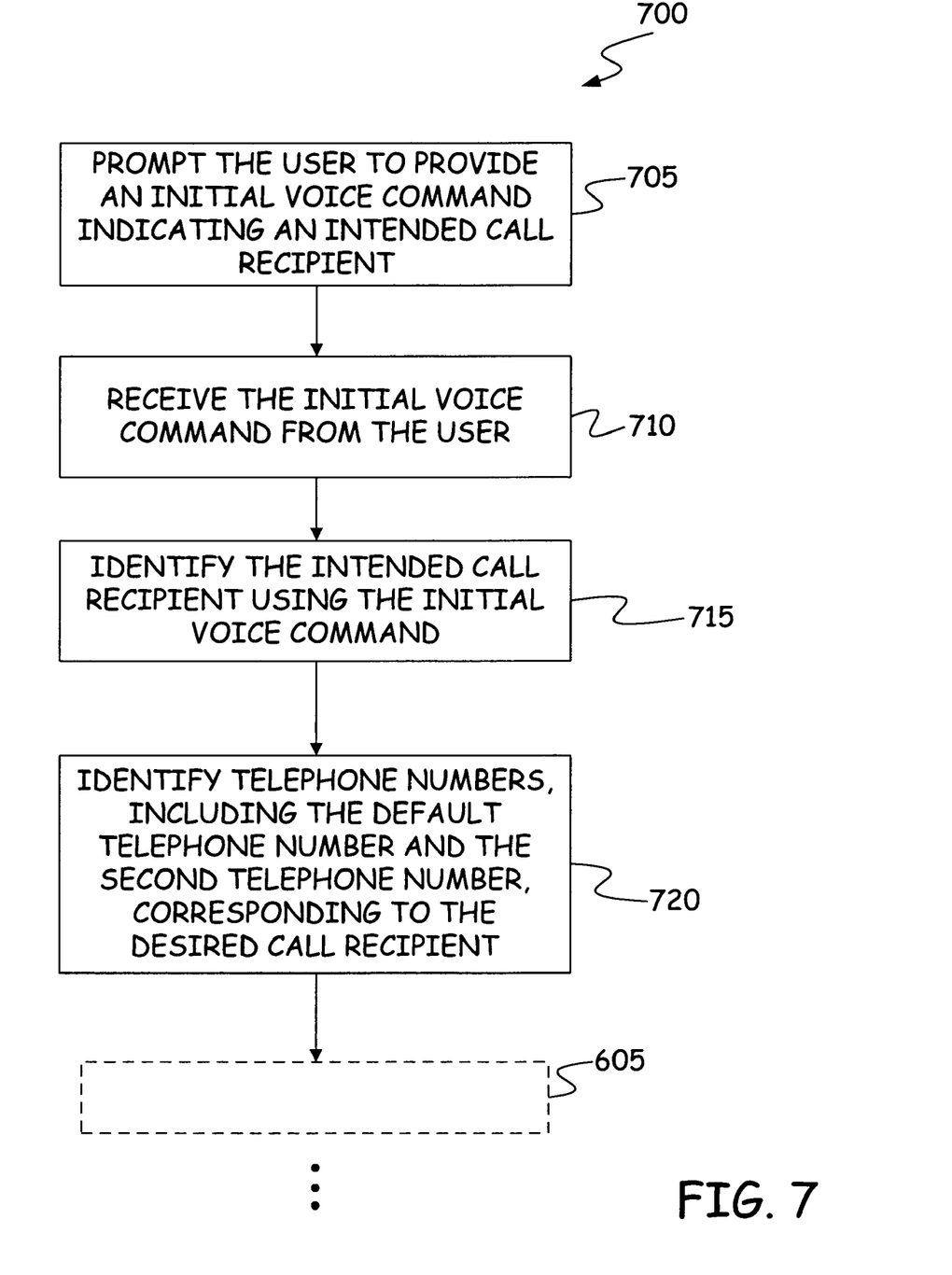

Referring now to FIGS. 6 and 7, shown are flow diagrams 600 and 700 demonstrating methods of providing voice dialing assistance using a system such as the one illustrated in FIG. 5. As shown at block 605 in FIG. 6, the methods include the step of automatically initiating a call to a default telephone number. As illustrated at block 610, after the call to the default telephone number has been initiated, the caller or user is prompted to determine whether the user wishes to call a second telephone number instead of the default telephone number. If the user does wish to call the second telephone number, in the steps shown at blocks 615 and 620, the call to the default telephone number is terminated, and a call to the second telephone number is initiated.

Referring to flow diagram 700 shown in FIG. 7, in some embodiments the method can includes further steps before the step 605 of automatically initiating the call to the default telephone number. For example, at the step shown at block 705, the method can include prompting the user to provide an initial voice command indicating an intended call recipient. Once the initial voice command is received (step shown in block 710), the intended call recipient can be identified using the initial voice command. This is illustrated at block 715. Then, as illustrated at block 720, the method can include the step of identifying telephone numbers, including the default telephone number and the second telephone number, corresponding to the desired call recipient.

Other additional or modified steps can also be added to these methods, as was the case with the methods illustrated in FIGS. 3 and 4. For example, before the step of terminating the call to the default telephone number and initiating the call to the second telephone number, the method can further include receiving a second voice command from the user to select to call the second telephone number instead of the default telephone number. Similarly, as described above, the step of automatically initiating the call to the default telephone number can further include generating a verbal indication to the user that the default telephone number is being called.

Although the present invention has been described with reference to particular embodiments, workers skilled in the art will recognize that changes may be made in form and detail without departing from the spirit and scope of the invention. For example, the present invention is extensible to a wide variety of command systems. In any case where the system undertakes a lengthy operation that depends on something external, this same technique might apply. If a reasonable default can be decided upon, and the operation can be begun and aborted without penalty, the user can be given the opportunity to choose among the various possibilities after the default operation has already begun. For example, a database lookup operation that takes 5 seconds could be initiated and terminated by the user indicating that a non-default query should be used.

What is claimed is:

1. A method of executing operations in a voice-activated command system, the method comprising:

prompting a user to provide an initial voice command;

receiving the initial voice command from the user;

identifying a plurality of alternative operations, including a default operation and a second operation, in response to the initial voice command, wherein the default operation and the second operation respectively include calling a default telephone number and a second telephone number for a particular call recipient;

automatically initiating execution of the default operation by initiating a call to the default telephone number for the particular call recipient;

prompting the user, after the default operation has been initiated by initiating the call to the default telephone number for the particular call recipient, and during execution of the default operation, to determine whether the user wishes to execute the second operation to call the second telephone number for the particular call recipient instead of the default operation;

receiving a second voice command from the user to select to execute the second operation to call the second telephone number for the particular call recipient instead of the instead of the default operation;

terminating execution of the default operation by terminating the call to the default telephone number for the particular call recipient if the user wishes to execute the second operation instead of the default operation; and initiating execution of the second operation by initiating the call to the second telephone number for the particular call recipient if the user wishes to execute the second operation instead of the default operation.

2. The method of claim 1, wherein automatically initiating execution of the default operation further includes generating an audible indication to the user that the default operation is being executed.

3. The method of claim 1, wherein prompting the user to determine whether the user wishes to execute the second operation instead of the default operation farther comprises prompting the user, to determine whether the user wishes to execute the second operation instead of the default operation, during the generation of the audible indication to the user that the default operation is being executed.

4. A method of providing voice dialing assistance, the method comprising:

automatically initiating a call to a default telephone number for an intended call recipient, wherein automatically initiating the call to the default telephone number for the intended call recipient further comprise generating a verbal indication to the user that the default telephone number is being called;

generating an audible representation of the default telephone number ringing;

prompting the user after the call to the default telephone number has been initiated and during the audible representation of the default telephone number ringing, to determine whether the user wishes to call a second telephone number for the intended call recipient instead of the default telephone number;

terminating the call to the default telephone number for the intended call recipient if the user wishes to call the second telephone number for the intended call recipient; and initiating a call to the second telephone number for the intended call recipient if the user wishes to call the second telephone number.

5. The method of claim 4, and before automatically initiating the call to the default telephone number, the method comprising:

prompting the user to provide an initial voice command indicating the intended call recipient;

receiving the initial voice command from the user;

identifying the intended call recipient using the initial voice command; and identifying a plurality of telephone numbers, including the default telephone number and the second telephone number, corresponding to the intended call recipient.

6. The method of claim 5, and before terminating the call to the default telephone number and initiating the call to the second telephone number, the method farther comprising receiving a second voice command from the user to select to call the second telephone number instead of the default telephone number.

7. A computer storage medium having computer-executable instructions for performing command system operation executing steps comprising:

prompting a user to provide an initial command;

receiving the initial command from the user;

identifying a plurality of operations, including a default operation and a second operation, in response to the initial command;

automatically initiating execution of the default operation afer indentification of the plurality of operations, wherein automatically initiating execution of the default operation further includes generating an indication to the user that the default operation is being executed;

prompting the user, after the default operation has been initiated and during execution of the default operation and during the generation of the indication to the user that the default operatioin is being executed, to determine whether the user wishes to execute a second operation instead of the default operation;

terminating execution of the default operation if the user wishes to execute the second operation instead of the default operation; and initiating execution of the second operation if the user wishes to execute the second operation instead of the default operation.

8. The computer storage medium of claim 7, and further having computer-executable instructions for performing the further step comprising receiving a second command from the user, before terminating execution of the default operation and initiating execution of the second operation, to select to execute the second operation instead of the default operation.

* * * * *